United States Patent
Wu et al.

(10) Patent No.: US 10,359,750 B2
(45) Date of Patent: Jul. 23, 2019

(54) FREQUENCY CONTROL METHOD FOR MICRO-GRID AND CONTROL DEVICE

(71) Applicant: Tsinghua University, Beijing (CN)

(72) Inventors: Wenchuan Wu, Beijing (CN); Boming Zhang, Beijing (CN); Hongbin Sun, Beijing (CN); Zhongguan Wang, Beijing (CN); Qinglai Guo, Beijing (CN); Bin Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 480 days.

(21) Appl. No.: 15/375,246

(22) Filed: Dec. 12, 2016

(65) Prior Publication Data

US 2017/0300021 A1    Oct. 19, 2017

(30) Foreign Application Priority Data

Apr. 18, 2016   (CN) .......................... 2016 1 0243740

(51) Int. Cl.
  *G05B 19/042*   (2006.01)
  *H02J 3/00*   (2006.01)
  *H02J 3/38*   (2006.01)

(52) U.S. Cl.
  CPC .............. *G05B 19/042* (2013.01); *H02J 3/00* (2013.01); *H02J 3/381* (2013.01); *G05B 2219/2639* (2013.01); *Y02B 70/3241* (2013.01); *Y02P 80/14* (2015.11); *Y04S 20/227* (2013.01)

(58) Field of Classification Search
  CPC . G05B 19/042; G05B 2219/2639; H02J 3/00; H02J 3/381; Y02B 70/3241; Y02P 80/14; Y04S 20/227
  See application file for complete search history.

(56) References Cited

U.S. PATENT DOCUMENTS

| | | | | |
|---|---|---|---|---|
| 6,672,837 B1 * | 1/2004 | Veldkamp | ................ | F16F 7/10 416/144 |
| 8,610,299 B2 * | 12/2013 | Yasugi | .................... | F03D 7/047 290/44 |
| 10,107,261 B2 * | 10/2018 | Zheng | ................... | F03D 7/0296 |
| 2013/0221669 A1 * | 8/2013 | Yasugi | .................... | F03D 9/255 290/44 |
| 2016/0159250 A1 * | 6/2016 | Meng | ....................... | B60M 3/06 191/2 |
| 2016/0305403 A1 * | 10/2016 | Zheng | ................... | F03D 7/0296 |

* cited by examiner

*Primary Examiner* — Abdelmoniem I Elamin
(74) *Attorney, Agent, or Firm* — Hodgson Russ LLP

(57) ABSTRACT

The present disclosure provides a frequency control method for a micro-grid and a control device. The method includes: determining a middle parameter at iteration k; determining a local gradient parameter at iteration k according to the cost increment rate at iteration k, the frequency difference between iterations k and k+1, and communication coefficients; performing a quasi-Newton recursion according to the middle parameter and local gradient parameter to acquire a recursion value; determining the cost increment rate at iteration k+1 according to the recursion value; determining an adjustment value of an active power according to the cost increment rate at iteration k+1; adjusting the active power according to the adjustment value if the adjustment value satisfies a constraint condition and judging whether the difference is smaller than a predetermined threshold; executing k=k+1 if yes and stopping the frequency control if no.

20 Claims, 1 Drawing Sheet

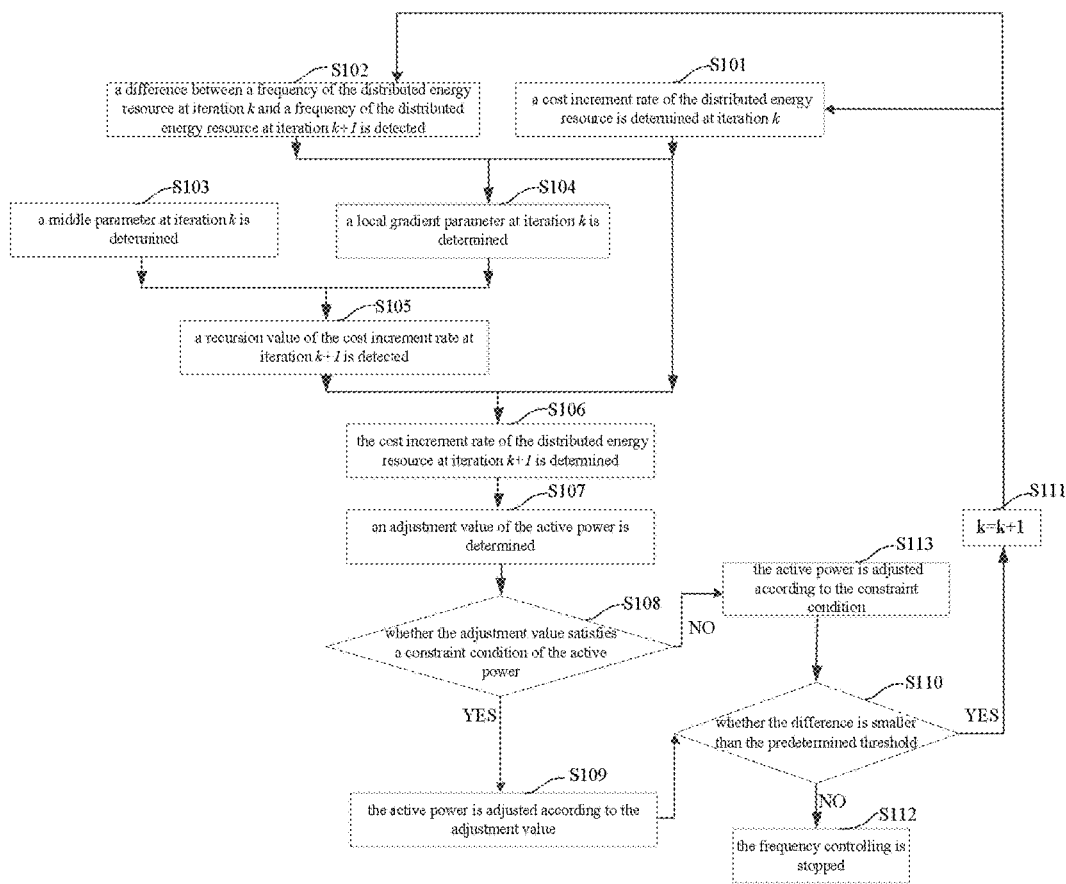

FREQUENCY CONTROL METHOD FOR MICRO-GRID AND CONTROL DEVICE

CROSS REFERENCE TO RELATED APPLICATION

This application is based upon and claims a priority to Chinese Patent Application Serial No. 201610243740.7, filed with the State Intellectual Property Office of P. R. China on Apr. 18, 2016, the entire contents of which are incorporated herein by reference.

TECHNICAL FIELD

The present disclosure generally relates to the field of power system control technology, and more particularly, to a frequency control method for a micro-grid and a control device.

BACKGROUND

The development of distributed generators based on renewable energy may optimize energy structure, may promote energy conservation and emissions reduction, and may realize the economic sustainable development. In recent years, the distributed generators based on the renewable energy are grid-connected to promote the development of a micro-grid. The micro-grid is a micro power distribution system clustering distributed generators, an energy storage system, an energy conversion device, associated loads and a monitoring and protecting device. The micro-grid is an autonomous system being able to self-controlled, self-protected and self-managed. The micro-grid may not only to operate with an external power grid but may operate in isolation.

With more and more wind power generation and photovoltaic power generation being employed in the micro-grid, due to a frequency fluctuation, intermittency and uncertainty, as well as a rapid changing of the loads and a low inertia of the micro-grid, there is provided a severe challenge towards a controller for ensuring safety of the micro-grid in isolation.

SUMMARY

A computer-implemented frequency control method for a micro-grid according to embodiments of the present disclosure includes: determining a cost increment rate of a distributed energy resource in the micro-grid at iteration k, wherein k is a positive integer greater than or equal to 0; detecting a difference between a frequency of the distributed energy resource at iteration k and a frequency of the distributed energy resource at iteration k+1; determining a middle parameter at iteration k; determining a local gradient parameter of the distributed energy resource at iteration k according to the cost increment rate at iteration k, the difference and communication coefficients between the distributed energy resource and adjacent distributed energy resources; performing a quasi-Newton recursion according to the middle parameter and the local gradient parameter to acquire a recursion value of the cost increment rate of the distributed energy resource at iteration k+1; determining the cost increment rate of the distributed energy resource at iteration k+1 according to the recursion value and the cost increment rate of the distributed energy resource at iteration k; determining an adjustment value of an active power of the distributed energy resource according to the cost increment rate of the distributed energy resource at iteration k+1; judging whether the adjustment value satisfies a constraint condition of the active power; adjusting the active power of the distributed energy resource according to the adjustment value if the adjustment value satisfies the constraint condition and further judging whether the difference is smaller than a predetermined threshold; executing k=k+1 if the difference is greater than or equal to the predetermined threshold and returning to the act of determining a cost increment rate of a distributed energy resource at iteration k; and stopping the frequency control if the difference is smaller than the predetermined threshold.

A control device according to embodiments of the present disclosure includes a housing, a processor, a memory, a circuit board and a power circuit. The circuit board is arranged inside a space enclosed by the housing; the processor and the memory are disposed on the circuit board; the power circuit is configured to provide power for individual circuit or component; the memory is configured to store an executable program code; and the processor, by reading the executable program code stored in the memory, is configured to run a program corresponding to the executable program code, so as to perform the followings: determining a cost increment rate of a distributed energy resource in the micro-grid at iteration k, wherein k is a positive integer greater than or equal to 0; detecting a difference between a frequency of the distributed energy resource at iteration k and a frequency of the distributed energy resource at iteration k+1; determining a middle parameter at iteration k; determining a local gradient parameter of the distributed energy resource at iteration k according to the cost increment rate at iteration k, the difference and communication coefficients between the distributed energy resource and adjacent distributed energy resources; performing a quasi-Newton recursion according to the middle parameter and the local gradient parameter to acquire a recursion value of the cost increment rate of the distributed energy resource at iteration k+1; determining the cost increment rate of the distributed energy resource at iteration k+1 according to the recursion value and the cost increment rate of the distributed energy resource at iteration k; determining an adjustment value of an active power of the distributed energy resource according to the cost increment rate of the distributed energy resource at iteration k+1; judging whether the adjustment value satisfies a constraint condition of the active power; adjusting the active power of the distributed energy resource according to the adjustment value if the adjustment value satisfies the constraint condition and further judging whether the difference is smaller than a predetermined threshold; executing k=k+1 if the difference is greater than or equal to the predetermined threshold and returning to the act of determining a cost increment rate of a distributed energy resource at iteration k; and stopping the frequency control if the difference is smaller than the predetermined threshold.

A non-transitory computer-readable storage medium having stored therein instructions that, when executed by a processor of a device, causes the device to perform a computer-implemented frequency control method for a micro-grid, the method including: determining a cost increment rate of a distributed energy resource in the micro-grid at iteration k, wherein k is a positive integer greater than or equal to 0; detecting a difference between a frequency of the distributed energy resource at iteration k and a frequency of the distributed energy resource at iteration k+1; determining a middle parameter at iteration k; determining a local gradient parameter of the distributed energy resource at iteration k according to the cost increment rate at iteration k, the difference and communication coefficients between the distributed energy resource and adjacent distributed energy resources; performing a quasi-Newton recursion according to the middle parameter and the local gradient parameter to acquire a recursion value of the cost increment rate of the distributed energy resource at iteration k+1; determining the cost increment rate of the distributed energy resource at iteration k+1 according to the recursion value and the cost increment rate of the distributed energy resource at iteration k; determining an adjustment value of an active power of the distributed energy resource according to the cost increment rate of the distributed energy resource at iteration k+1; judging whether the adjustment value satisfies a constraint condition of the active power; adjusting the active power of the distributed energy resource according to the adjustment value if the adjustment value satisfies the constraint condition and further judging whether the difference is smaller than a predetermined threshold; executing k=k+1 if the difference is greater than or equal to the predetermined threshold and returning to the act of determining a cost increment rate of a distributed energy resource at iteration k; and stopping the frequency control if the difference is smaller than the predetermined threshold.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which:

FIG. 1 is a flow chart showing a frequency control method for a micro-grid according to an embodiment of the present disclosure.

DETAILED DESCRIPTION

Reference will now be made in detail to exemplary embodiments, examples of which are illustrated in the accompanying drawings. The same or similar elements and elements having same or similar functions are denoted by like reference numerals throughout the descriptions. The embodiments described herein with reference to the accompanying drawings are explanatory and used to generally understand the present disclosure, which is not construed to limit the embodiments of the present disclosure.

In the description, it is to be understood that, terms such as "first" and "second" are used herein for purposes of description and are not intended to indicate or imply relative importance or significance. In the description of the present disclosure, it is to be illustrated that, unless specified or limited otherwise, terms "interconnected," and "connected," are understood broadly, such as fixed, detached or integral interconnections and connections, also can be mechanical or electrical interconnections and connections, further can be direct interconnections and connections and indirect interconnections and connections via intermediate medium. For those skilled in the art, it can be understood the concrete meaning of the terms mentioned above in the present disclosure according to specific circumstances. Furthermore, in the description of the present disclosure, unless illustrated otherwise, "a plurality of" means two or more than two.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. These and other aspects should be understood by those skilled in the art with reference to the following description and drawings. In these description and drawings, some particular implementations of the present disclosure are disclosed to present some ways for implementing the principle of the present disclosure. However, it should be understood that embodiments of the present disclosure is not limited to this. Contrarily, embodiments of the present disclosure include all the variations, modifications and equivalents within the spirit and scope of the appended claims.

The frequency control method for a micro-grid according to embodiments of the present disclosure will be described with reference to drawings.

In an embodiment of the present disclosure, a generation cost of a distributed energy resource is determined according to a formula of $$C_i(P_i) = a_i P_i^2 + b_i P_i + c_i$$

where, i is the distributed energy resource and is a positive integer greater than 0, $P_i$ is an active power of the distributed energy resource i, $a_i$ is a first coefficient, $b_i$ is a second coefficient, $c_i$ is a third coefficient and $C_i(P_i)$ is the generation cost of the distributed energy resource i.

In an embodiment of the present disclosure, by taking a derivative of the generation cost, a cost increment rate of the distributed energy resource i is acquired as a formula of $$x_i(P_i) = a_i P_i + b_i$$

where, $x_i(P_i)$ is the cost increment rate of the distributed energy resource i.

In an embodiment of the present disclosure, the distributed energy resource may be a conventional generator taking a fossil energy source as primary energy, or a renewable generator taking a renewable energy source as primary energy, or an energy storage system. Ranges of the first coefficient, the second coefficient and the third coefficient vary with the type of the distributed energy resource.

In an embodiment of the present disclosure, for the conventional generator taking the fossil energy source as primary energy, the first coefficient, the second coefficient and the third coefficient are determined according to a fuel cost, an equipment acquisition cost and a maintenance cost. For example, for a micro-grid of low voltage with a small scale, the first coefficient ranges from 0.01 to 1, the second coefficient ranges from 0.1 to 5 and the third coefficient ranges from 5 to 100 while a power is in kilowatt as a unit and a cost is in Yuan(RMB) as a unit.

In an embodiment of the present disclosure, for the renewable generator taking the renewable energy source as primary energy, the first coefficient, the second coefficient and the third coefficient are determined according to a formula of $$\begin{cases} a_q = 1/P_q^{max} \\ b_q = -2 \\ c_q = P_q^{max} \end{cases}$$

where, q is the renewable generator, $a_q$ is the first coefficient of the renewable generator q, $b_q$ is the second coefficient of the renewable generator q, $c_q$ is the third coefficient of the renewable generator q, and $P_q^{max}$ is a maximum available generating capacity of the renewable generator q.

In an embodiment of the present disclosure, for the energy storage system, it is assumed that the generating power is a negative value if the energy storage system is in a charging state. The first coefficient and the third coefficient are determined according to an equipment acquisition cost and a maintenance cost when the second coefficient is 0. The first coefficient is determined according to a charging state or a discharging state, however, the third coefficient ranges from 5 to 100. Specifically, the first coefficient ranges from 0.02 to 1 if the energy storage system is in the discharging state; or the first coefficient ranges from 0.01 to 0.5 if the energy storage system is in the charging state.

FIG. 1 is a flow chart showing a frequency control method for a micro-grid according to an embodiment of the present disclosure. As shown in FIG. 1, the method includes followings.

At block S101, a cost increment rate of the distributed energy resource is determined at iteration k, in which k is a positive integer greater than or equal to 0.

When k=0, the cost increment rate of the distributed energy resource is determined according to the formula of $x_i(P_i)=2a_iP_i+b_i$. That is to say, a current active power is substituted to $x_i(P_i)=2a_iP_i+b_i$ to obtain an initial cost increment rate.

When k>0, the cost increment rate of the distributed energy resource is acquired from the last iteration, which is record according to the last iteration result.

In an embodiment of the present disclosure, the method further includes exchanging the cost increment rate between the distributed energy resource and distributed energy resources directly connected therewith.

Specifically, the cost increment rate at iteration k is exchanged between the distributed energy resource and the distributed energy resources in electrical topology and directly connected therewith. For the distributed energy resource i, a self $x_i(k)$ (i.e. the cost increment rate at iteration k) is sent to the distributed energy resource j directly connected therewith, where $j \in N_i$, and $N_i$ is a set of indexes of all distributed energy resources directly connected with the distributed energy resource i, while the cost increment rate $x_j(k)$ at iteration k of the distributed energy resource j is received by the distributed energy resource i.

At block S102, a difference between a frequency of the distributed energy resource at iteration k and a frequency of the distributed energy resource at iteration k+1 is detected.

In detail, the difference (i.e. a frequency change) (f(k+1)−f(k)) is measured. f(k) represents the frequency of the distributed energy resource at iteration k and f(k+1) represents the frequency of the distributed energy resource at iteration k+1.

At block S103, a middle parameter at iteration k is determined.

In an embodiment of the present disclosure, the middle parameter is determined at iteration k according to a formula of $$D_{ii,k} = \alpha \cdot \frac{1}{2a_i} \cdot \frac{1}{m}\sum_{i=1}^{m}\frac{1}{2a_i} + 2 - 2\mu_{ii}$$

where, i is the distributed energy resource and is a positive integer greater than 0, $D_{ii,k}$ is the middle parameter, $\alpha$ is a positive real number and is smaller than 1, m is the number of the distributed energy resources in the micro-grid, $\alpha_i$ is the first coefficient, $\mu_{ii}$ is the communication coefficient of the distributed energy resource i itself (i.e. between the distributed energy resource i and the distributed energy resource i).

In an embodiment of the present disclosure, $\alpha$ is determined according to a capacity of the micro-grid or according to an experiment. For example, for a micro-grid of low voltage with a small scale, $\alpha$ ranges from 0.1 to 1.

In an embodiment of the present disclosure, the communication coefficient is determined according to a formula of $$\begin{cases} \frac{2}{n_i + n_j + 1}, & j \in N_i \\ \sum_{j \in N_i} 1 - \frac{2}{n_i + n_j + 1}, & j = 1 \\ 0, & \text{otherwise} \end{cases}$$

where, i is the distributed energy resource and is a positive integer greater than 0, j is a distributed energy resource directly connected with the distributed energy resource i and is a positive integer greater than 0, $N_i$ is a set of indexes of all distributed energy resources directly connected with the distributed energy resource i, $n_i$ is the number of the distributed energy resources directly connected with the distributed energy resource i, and $n_j$ is the number of the distributed energy resources directly connected with the distributed energy resource j.

At block S104, a local gradient parameter of the distributed energy resource at iteration k is determined according to the cost increment rate at iteration k, the difference and the communication coefficients between the distributed energy resource and adjacent distributed energy resources.

In an embodiment of the present disclosure, the local gradient parameter is determined according to a formula of $$g_{i,k} = x_i(k) - \sum_{j \in N_i} \mu_{ij}x_j(k) + K \cdot (f(k+1) - f(k))$$

where, $g_k$ is the local gradient parameter, $N_i$ is a set of indexes of all distributed energy resources directly connected with the distributed energy resource i, $\mu_{ij}$ is a communication coefficient between the distributed energy resource i and the distributed energy resource j, $x_i(k)$ is the cost increment rate of the distributed energy resource i at iteration k, $x_j(k)$ is the cost increment rate of the distributed energy resource j at iteration k, K is a weight coefficient of frequency, f(k+1) is the frequency at iteration k+1, and f(k) is the frequency at iteration k.

In an embodiment of the present disclosure, K is selected according to a capacity of the micro-grid or according to an experiment. For example, for a micro-grid of low voltage with a small scale, K ranges from 1 to 10.

At block S105, a quasi-Newton recursion is performed according to the middle parameter and the local gradient parameter to acquire a recursion value of the cost increment rate of the distributed energy resource at iteration k+1.

In an embodiment of the present disclosure, the Newton direction value of the distributed energy resource is calculated in S105 based on recursion. In detail, S105 includes S1 to S7.

S1, an index recursion t=0 is set, in which if t=T, the quasi-Newton recursion is finished, t is a positive integer greater than or equal to 0, and T is a positive integer greater than or equal to 1. For example, T may range from 3 to 5.

S2, an initial Newton direction value is calculated according to a formula of $$d_{i,k}^{(0)} = D_{ii,k}^{-1} g_{i,k}.$$

S3, it is judged whether t<T, in which if yes, S4 to S6 are executed, and if no, S7 is executed;

S4, the Newton direction value is exchanged between the distributed energy resource and distributed energy resources directly connected therewith.

In detail, the Newton direction value of the distributed energy resource i at recursion t of iteration k is sent to the distributed energy resource j directly connected with the distributed energy resource i, and the Newton direction value of the distributed energy resource j at recursion t of iteration k is received by the distributed energy resource i.

S5, a recursion is performed according to a formula of $$d_{i,k}^{(t+1)} = D_{ii,k}^{-1} \left( \sum_{j \in N_i} B_{ij} d_{i,k}^{(t)} - g_{i,k} \right)$$

where, $d_{i,k}^{(t)}$ is the Newton direction value of the distributed energy resource i at recursion t of iteration k, $d_{i,k}^{(t+1)}$ is the Newton direction value of the distributed energy resource i at recursion t+1 of iteration k, $B_{ij}$ is a constant matrix.

S6, t=t+1, and it is returned to S3.

S7, the recursion is stopped, and a Newton direction value of the distributed energy resource i at recursion T of iteration k is taken as the recursion value of the cost increment rate of the distributed energy resource at iteration k+1.

At block S106, the cost increment rate of the distributed energy resource at iteration k+1 is determined according to the recursion value and the cost increment rate of the distributed energy resource at iteration k.

In an embodiment of the present disclosure, the cost increment rate of the distributed energy resource at iteration k+1 is determined according to a formula of $$x_i(k+1) = x_i(k) - \lambda d_{i,k}^{(T)}$$

where, $x_i(k+1)$ is the cost increment rate of the distributed energy resource i at iteration k+1, λ is an iteration step-size, T is the predetermined stopping step of the recursion, $d_{i,k}^{(T)}$ is the Newton direction stopping value of the distributed energy resource i at recursion T of iteration k, i.e. recursion value of the cost increment rate of the distributed energy resource at iteration k+1.

In an embodiment of the present disclosure, λ is determined according to a capacity of the micro-grid or according to an experiment. For example, for a micro-grid of low voltage with a small scale, λ ranges from 0.1 to 10.

At block S107, an adjustment value of the active power of the distributed energy resource is determined according to the cost increment rate of the distributed energy resource at iteration k+1.

In an embodiment of the present disclosure, the adjustment value is determined according to a formula of $$\Delta P_i(k) = \frac{ICR_i(k+1) - b_i}{2a_i} - P_i(k)$$

where, $ICR_i(k+1)$ is the cost increment rate of the distributed energy resource i at iteration k+1, and $P_i(k)$ is the active power of the distributed energy resource i at iteration k.

At block S108, it is judged whether the adjustment value satisfies a constraint condition of the active power.

In an embodiment of the present disclosure, if the distributed energy resource is a conventional generator taking a fossil energy source as primary energy, the constraint condition of the active power may be that $P_p^{min} \leq P_p \leq P_p^{max}$, in which, $P_p^{min}$ and $P_p^{max}$ are a lower limiting constraint condition and an upper limiting constraint condition of the active power of the conventional generator p respectively, and p is a positive integer greater than 0. The maximum generation power of the conventional generator may be taken as the upper limiting constraint condition of the active power of the conventional generator, and the minimum power for needed for maintaining the conventional generator without cease-fire.

In an embodiment of the present disclosure, if the distributed energy resource is a renewable generator taking a renewable energy source as primary energy, the constraint condition of the active power may be that $0 \leq P_q \leq P_q^{max}$, in which, $P_q^{max}$ is an upper limiting value of the renewable generator q, and q is a positive integer greater than 0. The maximum available generating capacity of the renewable generator is taken as the upper limiting value of the renewable generator.

In an embodiment of the present disclosure, if the distributed energy resource is in an energy storage system, the constraint condition of the active power may be $P_r^{min} \leq P_r \leq P_r^{max}$, in which, $P_r^{min}$ and $P_r^{max}$ are a lower limiting value and an upper limiting value of the active power of the energy storage system r respectively, and r is a positive integer greater than 0. The maximum allowable discharge power of the energy storage system is taken as the upper limiting value of the active power of the energy storage system, and the maximum allowable charge power of the energy storage system is taken as the lower limiting value of the active power of the energy storage system.

At block S109, the active power of the distributed energy resource is adjusted according to the adjustment value if the adjustment value satisfies the constrained condition.

At block S110, it is judged whether the difference is smaller than the predetermined threshold.

In an embodiment of the present disclosure, the predetermined threshold is a positive real number and ranges from 0.001 to 0.1.

At block S111, k=k+1 is executed, if the difference is greater than or equal to the predetermined threshold and S101 and S102 are executed again.

In an embodiment of the present disclosure, S101 is executed again after 0.01 seconds.

At block S112, the frequency controlling is stopped if the difference is smaller than the predetermined threshold.

At block S113, the active power of the distributed energy resource is adjusted according to the constraint condition if the adjustment value is not satisfied the constrained condition and S110, S111 and S112 are executed.

In an embodiment of the present disclosure, adjusting the active power of the distributed energy resource according to the constraint condition includes fixing the active power onto a boundary of the constraint condition.

The method according to embodiments of the present disclosure, may avoid distributed control architecture, may have better dynamic performance, may minimize a cost and may make a full use of renewable energy. In addition, the method may avoid a centralized controller, and may realize a distributed frequency control based on peer to peer communication, thereby avoiding a possibility that a global paralysis of the system results from a single-point fault.

In order to achieve the above embodiments, embodiments of the present disclosure further provide a controlling device, including a housing, a processor, a memory, a circuit board and a power circuit. The circuit board is arranged inside a space enclosed by the housing; the processor and the memory are disposed on the circuit board; the power circuit is configured to provide power for individual circuit or component; the memory is configured to store an executable program code; and the processor, by reading the executable program code stored in the memory, is configured to run a program corresponding to the executable program code, so as to perform the method according to any one of embodiments mentioned above.

It is to be illustrated that, description and explanation of the controlling device according to embodiments of the present disclosure may be understood with reference to the method embodiments, which is not elaborated herein.

Embodiments of the present disclosure further provide a non-transitory computer-readable storage medium having stored therein instructions that, when executed by a processor of a device, causes the device to perform the frequency control method for a micro-grid.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium. The storage medium mentioned above may be read-only memories, magnetic disks or CD, etc.

In the description, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the above terms in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A computer-implemented frequency control method for a micro-grid, comprising:
    determining a cost increment rate of a distributed energy resource in the micro-grid at iteration k, wherein k is a positive integer greater than or equal to 0;
    detecting a difference between a frequency of the distributed energy resource at iteration k and a frequency of the distributed energy resource at iteration k+1;
    determining a middle parameter at iteration k;
    determining a local gradient parameter of the distributed energy resource at iteration k according to the cost increment rate at iteration k, the difference and communication coefficients between the distributed energy resource and adjacent distributed energy resources;
    performing a quasi-Newton recursion according to the middle parameter and the local gradient parameter to acquire a recursion value of the cost increment rate of the distributed energy resource at iteration k+1;
    determining the cost increment rate of the distributed energy resource at iteration k+1 according to the recursion value and the cost increment rate of the distributed energy resource at iteration k;
    determining an adjustment value of an active power of the distributed energy resource according to the cost increment rate of the distributed energy resource at iteration k+1;

judging whether the adjustment value satisfies a constraint condition of the active power;

adjusting the active power of the distributed energy resource according to the adjustment value if the adjustment value satisfies the constraint condition and further judging whether the difference is smaller than a predetermined threshold;

executing k=k+1 if the difference is greater than or equal to the predetermined threshold and returning to the act of determining a cost increment rate of a distributed energy resource at iteration k; and stopping the frequency control if the difference is smaller than the predetermined threshold.

2. The method according to claim 1, further comprising:
adjusting the active power of the distributed energy resource according to the constraint condition if the adjustment value is not satisfied the constrained condition and executing the act of judging whether the difference is smaller than a predetermined threshold.

3. The method according to claim 1, before determining a middle parameter at iteration k, further comprising:
exchanging the cost increment rate between the distributed energy resource and distributed energy resources directly connected therewith.

4. The method according to claim 1, wherein
if k=0, the cost increment rate of the distributed energy resource at iteration k is determined according to a formula of $$x_i(P_i) = 2a_i P_i + b_i$$

where, i is the distributed energy resource and is a positive integer greater than 0, $P_i$ is the active power of the distributed energy resource i, $x_i(P_i)$ is the cost increment rate of the distributed energy resource i, $\alpha_i$ is a first coefficient and k is a second coefficient.

5. The method according to claim 1, wherein the middle parameter at iteration k is determined according to a formula of $$D_{ii,k} = \alpha \cdot \frac{1}{2a_i} \cdot \frac{1}{m} \sum_{i=1}^{m} \frac{1}{2a_i} + 2 - 2\mu_{ii}$$

where, i is the distributed energy resource and is a positive integer greater than 0, $D_{ii,k}$ is the middle parameter, $\alpha$ is a positive real number and is smaller than 1, $\alpha_i$ is a first coefficient, m is the number of the distributed energy resources in the micro-grid, $\mu_{ii}$ is the communication coefficient of the distributed energy resource i itself.

6. The method according to claim 3, wherein the local gradient parameter is determined according to a formula of $$g_{i,k} = x_i(k) - \sum_{j \in N_i} \mu_{ij} x_j(k) + K \cdot (f(k+1) - f(k))$$

where, i is the distributed energy resource and is a positive integer greater than 0, $g_{i,k}$ is the local gradient parameter, j is a distributed energy resource directly connected with the distributed energy resource i and is a positive integer greater than 0, $N_i$ is a set of indexes of all distributed energy resources directly connected with the distributed energy resource i, $\mu_{ij}$ is a communication coefficient between the distributed energy resource i and the distributed energy resource j, $x_i(k)$ is the cost increment rate of the distributed energy resource i at iteration k, $x_j(k)$ is the cost increment rate of the distributed energy resource j at iteration k, K is a weight coefficient of frequency, f(k+1) is the frequency at iteration k+1, and f(k) is the frequency at iteration k.

7. The method according to claim 1, wherein the communication coefficient is determined according to a formula of $$\begin{cases} \frac{2}{n_i + n_j + 1}, & j \in N_i \\ \sum_{j \in N_i} 1 - \frac{2}{n_i + n_j + 1}, & j = 1 \\ 0, & \text{otherwise} \end{cases}$$

where, i is the distributed energy resource and is a positive integer greater than 0, j is a distributed energy resource directly connected with the distributed energy resource i and is a positive integer greater than 0, $n_i$ is the number of the distributed energy resources directly connected with the distributed energy resource i, $n_j$ is the number of the distributed energy resources directly connected with the distributed energy resource j, and $N_i$ is a set of indexes of all distributed energy resources directly connected with the distributed energy resource i.

8. The method according to claim 1, wherein performing a quasi-Newton recursion according to the middle parameter and the local gradient parameter to acquire a recursion value of the cost increment rate of the distributed energy resource at iteration k+1 comprises:

S1, setting an index recursion t=0, wherein if t=T, the quasi-Newton recursion is finished, t is a positive integer greater than or equal to 0, and T is a positive integer greater than or equal to 1;

S2, calculating an initial Newton direction value according to a formula of $$d_{i,k}^{(0)} = D_{ii,k}^{-1} g_{i,k}$$

where, i is the distributed energy resource and is a positive integer greater than 0, $D_{ii,k}$ is the middle parameter of the distributed energy resource i at iteration k and $g_{i,k}$ is the local gradient parameter of the distributed energy resource i at iteration k;

S3, judging whether t<T, wherein if yes, S4 to S6 are executed, and if no, S7 is executed;

S4, exchanging the Newton direction value between the distributed energy resource and distributed energy resources directly connected therewith;

S5, performing a recursion according to a formula of $$d_{i,k}^{(t+1)} = D_{ii,k}^{-1} \left( \sum_{j \in N_i} B_{ij} d_{i,k}^{(t)} - g_{i,k} \right)$$

where, j is the distributed energy resource directly connected with the distributed energy resource i and is a positive integer greater than 0, $d_{i,k}^{(t)}$ is the Newton direction value of the distributed energy resource i at recursion t of iteration k, $d_{i,k}^{(t+1)}$ is the Newton direction value of the distributed energy resource i at recursion t+1 of iteration k, $B_{ij}$ is a constant matrix; and S6, setting t=t+1, and returning to S3;

S7, stopping the recursion, and taking a Newton direction value of the distributed energy resource i at recursion T of iteration k as the recursion value of the cost increment rate of the distributed energy resource at iteration k+1.

9. The method according to claim 8, wherein determining the cost increment rate of the distributed energy resource at iteration k+1 according to the recursion value and the cost increment rate of the distributed energy resource at iteration k comprises:
determining the cost increment rate of the distributed energy resource at iteration k+1 according to a formula of $$x_i(k+1)=x_i(k)-\lambda d_{i,k}^{(T)}$$

where, $x_i$ (k+1) is the cost increment rate of the distributed energy resource i at iteration k+1, $x_i$ (k) is the cost increment rate of the distributed energy resource i at iteration k, $\lambda$ is an iteration step-size, $d_{i,k}^{(T)}$ is the Newton direction value of the distributed energy resource i at recursion T of iteration k.

10. The method according to claim 1, wherein the adjustment value is determined according to a formula of $$\Delta P_i(k) = \frac{ICR_i(k+1) - b_i}{2a_i} - P_i(k)$$

where, i is the distributed energy resource and is a positive integer greater than 0, $ICR_i$ (k+1) is the cost increment rate of the distributed energy resource i at iteration k+1, $\alpha_i$ is a first coefficient, $b_i$ is a second coefficient and $P_i(k)$ is the active power of the distributed energy resource i at iteration k.

11. The method according to claim 2, wherein adjusting the active power of the distributed energy resource according to the constraint condition comprises:
fixing the active power onto a boundary of the constraint condition.

12. The method according to claim 1, wherein the constraint condition comprises:
$P_p^{min} \leq P_p \leq P_p^{max}$, if the distributed energy resource is a conventional generator taking a fossil energy source as primary energy, where, $P_p^{min}$ and $P_p^{max}$ are a lower limiting value and an upper limiting value of the active power of the conventional generator p respectively; or,
$0 \leq P_q \leq P_q^{max}$, if the distributed energy resource is a renewable generator taking a renewable energy source as primary energy, where, $P_p^{max}$ is an upper limiting value of the active power of the renewable generator q; or,
$P_r^{min} \leq P_r \leq P_r^{max}$, if the distributed energy resource is in an energy storage system, where, $P_r^{min}$ and $P_r^{max}$ are a lower limiting value and an upper limiting value of the active power of the energy storage system r respectively.

13. A control device, comprising a housing, a processor, a memory, a circuit board and a power circuit, wherein the circuit board is arranged inside a space enclosed by the housing; the processor and the memory are disposed on the circuit board; the power circuit is configured to provide power for individual circuit or component; the memory is configured to store an executable program code; and the processor, by reading the executable program code stored in the memory, is configured to run a program corresponding to the executable program code, so as to perform:
determining a cost increment rate of a distributed energy resource in the micro-grid at iteration k, wherein k is a positive integer greater than or equal to 0;
detecting a difference between a frequency of the distributed energy resource at iteration k and a frequency of the distributed energy resource at iteration k+1;
determining a middle parameter at iteration k;
determining a local gradient parameter of the distributed energy resource at iteration k according to the cost increment rate at iteration k, the difference and communication coefficients between the distributed energy resource and adjacent distributed energy resources;
performing a quasi-Newton recursion according to the middle parameter and the local gradient parameter to acquire a recursion value of the cost increment rate of the distributed energy resource at iteration k+1;
determining the cost increment rate of the distributed energy resource at iteration k+1 according to the recursion value and the cost increment rate of the distributed energy resource at iteration k;
determining an adjustment value of an active power of the distributed energy resource according to the cost increment rate of the distributed energy resource at iteration k+1;
judging whether the adjustment value satisfies a constraint condition of the active power;
adjusting the active power of the distributed energy resource according to the adjustment value if the adjustment value satisfies the constraint condition and further judging whether the difference is smaller than a predetermined threshold;
executing k=k+1 if the difference is greater than or equal to the predetermined threshold and returning to the act of determining a cost increment rate of a distributed energy resource at iteration k; and
stopping the frequency control if the difference is smaller than the predetermined threshold.

14. A non-transitory computer-readable storage medium having stored therein instructions that, when executed by a processor of a device, causes the device to perform a computer-implemented frequency control method for a micro-grid, the method comprising:
determining a cost increment rate of a distributed energy resource in the micro-grid at iteration k, wherein k is a positive integer greater than or equal to 0;
detecting a difference between a frequency of the distributed energy resource at iteration k and a frequency of the distributed energy resource at iteration k+1;
determining a middle parameter at iteration k;
determining a local gradient parameter of the distributed energy resource at iteration k according to the cost increment rate at iteration k, the difference and communication coefficients between the distributed energy resource and adjacent distributed energy resources;
performing a quasi-Newton recursion according to the middle parameter and the local gradient parameter to acquire a recursion value of the cost increment rate of the distributed energy resource at iteration k+1;
determining the cost increment rate of the distributed energy resource at iteration k+1 according to the recursion value and the cost increment rate of the distributed energy resource at iteration k;
determining an adjustment value of an active power of the distributed energy resource according to the cost increment rate of the distributed energy resource at iteration k+1;
judging whether the adjustment value satisfies a constraint condition of the active power;
adjusting the active power of the distributed energy resource according to the adjustment value if the adjustment value satisfies the constraint condition and further judging whether the difference is smaller than a predetermined threshold;
executing k=k+1 if the difference is greater than or equal to the predetermined threshold and returning to the act of determining a cost increment rate of a distributed energy resource at iteration k; and
stopping the frequency control if the difference is smaller than the predetermined threshold.

15. The non-transitory computer-readable storage medium according to claim 14, wherein the middle parameter at iteration k is determined according to a formula of $$D_{ii,k} = \alpha \cdot \frac{1}{2a_i} \cdot \frac{1}{m}\sum_{i=1}^{m}\frac{1}{2a_i} + 2 - 2\mu_{ii}$$

where, i is the distributed energy resource and is a positive integer greater than 0, $D_{ii,k}$ is the middle parameter, $\alpha$ is a positive real number and is smaller than 1, $a_i$ is a first coefficient, m is the number of the distributed energy resources in the micro-grid, $\mu_{ii}$ is the communication coefficient of the distributed energy resource i itself.

16. The non-transitory computer-readable storage medium according to claim 14, wherein the local gradient parameter is determined according to a formula of $$g_{i,k} = x_i(k) - \sum_{j \in N_i}\mu_{ij}x_j(k) + K \cdot (f(k+1) - f(k))$$

where, i is the distributed energy resource and is a positive integer greater than 0, $g_{i,k}$ is the local gradient parameter, j is a distributed energy resource directly connected with the distributed energy resource i and is a positive integer greater than 0, $N_i$ is a set of indexes of all distributed energy resources directly connected with the distributed energy resource i, $\mu_{ij}$ is a communication coefficient between the distributed energy resource i and the distributed energy resource j, $x_i(k)$ is the cost increment rate of the distributed energy resource i at iteration k, $x_j(k)$ is the cost increment rate of the distributed energy resource j at iteration k, K is a weight coefficient of frequency, f(k+1) is the frequency at iteration k+1, and f(k) is the frequency at iteration k.

17. The non-transitory computer-readable storage medium according to claim 14, wherein performing a quasi-Newton recursion according to the middle parameter and the local gradient parameter to acquire a recursion value of the cost increment rate of the distributed energy resource at iteration k+1 comprises:
S1, setting an index recursion t=0, wherein if t=T, the quasi-Newton recursion is finished, t is a positive integer greater than or equal to 0, and T is a positive integer greater than or equal to 1;
S2, calculating an initial Newton direction value according to a formula of $$d_{i,k}^{(0)} = D_{ii,k}^{-1}g_{i,k}$$

where, i is the distributed energy resource and is a positive integer greater than 0, $D_{ii,k}$ is the middle parameter of the distributed energy resource i at iteration k and $g_{i,k}$ is the local gradient parameter of the distributed energy resource i at iteration k;
S3, judging whether t<T, wherein if yes, S4 to S6 are executed, and if no, S7 is executed;

S4, exchanging the Newton direction value between the distributed energy resource and distributed energy resources directly connected therewith;
S5, performing a recursion according to a formula of $$d_{i,k}^{(t+1)} = D_{ii,k}^{-1}\left(\sum_{j \in N_i} B_{ij}d_{i,k}^{(t)} - g_{i,k}\right)$$

where, j is the distributed energy resource directly connected with the distributed energy resource i and is a positive integer greater than 0, $d_{i,k}^{(t)}$ is the Newton direction value of the distributed energy resource i at recursion t of iteration k, $d_{i,k}^{(t+1)}$ is the Newton direction value of the distributed energy resource i at recursion t+1 of iteration k, $B_{ij}$ is a constant matrix; and
S6, setting t=t+1, and returning to S3;
S7, stopping the recursion, and taking a Newton direction value of the distributed energy resource i at recursion T of iteration k as the recursion value of the cost increment rate of the distributed energy resource at iteration k+1.

18. The non-transitory computer-readable storage medium according to claim 17, wherein determining the cost increment rate of the distributed energy resource at iteration k+1 according to the recursion value and the cost increment rate of the distributed energy resource at iteration k comprises:
determining the cost increment rate of the distributed energy resource at iteration k+1 according to a formula of $$x_i(k+1) = x_i(k) - \lambda d_{i,k}^{(T)}$$

where, $x_i(k+1)$ is the cost increment rate of the distributed energy resource i at iteration k+1, $x_i(k)$ is the cost increment rate of the distributed energy resource i at iteration k, $\lambda$ is an iteration step-size, $d_{i,k}^{(T)}$ is the Newton direction value of the distributed energy resource i at recursion T of iteration k.

19. The non-transitory computer-readable storage medium according to claim 14, wherein the adjustment value is determined according to a formula of $$\Delta P_i(k) = \frac{ICR_i(k+1) - b_i}{2a_i} - P_i(k)$$

where, i is the distributed energy resource and is a positive integer greater than 0, $ICR_i(k+1)$ is the cost increment rate of the distributed energy resource i at iteration k+1, $a_i$ is a first coefficient, $b_i$ is a second coefficient and $P_i(k)$ is the active power of the distributed energy resource i at iteration k.

20. The non-transitory computer-readable storage medium according to claim 14, wherein the constraint condition comprises:
$P_p^{min} \leq P_p \leq P_p^{max}$ if the distributed energy resource is a conventional generator taking a fossil energy source as primary energy, where, $P_p^{min}$ and $P_p^{max}$ are a lower limiting value and an upper limiting value of the active power of the conventional generator p respectively; or,
$0 \leq P_q \leq P_q^{max}$, if the distributed energy resource is a renewable generator taking a renewable energy source as primary energy, where, $P_q^{max}$ is an upper limiting value of the active power of the renewable generator q; or, $P_r^{min} \leq P_r \leq P_r^{max}$, if the distributed energy resource is in an energy storage system, where, $P_r^{min}$ and $P_r^{max}$ are a lower limiting value and an upper limiting value of the active power of the energy storage system r respectively.

\* \* \* \* \*